(12) United States Patent
Wang et al.

(10) Patent No.: US 11,176,482 B2
(45) Date of Patent: Nov. 16, 2021

(54) TRAINING SIGNAL PROCESSING MODEL FOR COMPONENT REPLACEMENT IN SIGNAL PROCESSING SYSTEM

(71) Applicant: Dolby Laboratories Licensing Corporation, San Francisco, CA (US)

(72) Inventors: Guiping Wang, Beijing (CN); Lie Lu, San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 1046 days.

(21) Appl. No.: 15/571,677

(22) PCT Filed: May 4, 2016

(86) PCT No.: PCT/US2016/030811
§ 371 (c)(1),
(2) Date: Nov. 3, 2017

(87) PCT Pub. No.: WO2016/179299
PCT Pub. Date: Nov. 10, 2016

(65) Prior Publication Data
US 2018/0181880 A1    Jun. 28, 2018

Related U.S. Application Data

(60) Provisional application No. 62/164,764, filed on May 21, 2015.

(30) Foreign Application Priority Data

May 5, 2015    (CN) .......................... 201510224704.1

(51) Int. Cl.
*G06N 20/00*    (2019.01)
*G10L 25/51*    (2013.01)
(Continued)

(52) U.S. Cl.
CPC ........... *G06N 20/00* (2019.01); *G06N 3/0445* (2013.01); *G10L 25/51* (2013.01); *G10L 25/81* (2013.01)

(58) Field of Classification Search
None
See application file for complete search history.

(56) References Cited

U.S. PATENT DOCUMENTS 6,836,884 B1    12/2004    Evans
7,039,881 B2    5/2006    Regan
(Continued)

FOREIGN PATENT DOCUMENTS

EP    2117168    11/2009
WO    2005/085993    9/2005
(Continued)

OTHER PUBLICATIONS

Plasil, F. et al "Behavior Protocols for Software Components" IEEE Transactions on Software Engineering, vol. 28, Issue 11, pp. 1056-1076, Nov. 2002.
(Continued)

*Primary Examiner* — Alan Chen (57) ABSTRACT

Embodiments of training signal processing models for component replacement in signal processing systems are disclosed. A device for training a third signal processing model via a machine learning method include a first calculating unit, a second calculating unit and a training unit. The first calculating unit calculates a first output from each first sample in a first sample set based on a first signal processing model. The second calculating unit calculates a second output from the first sample based on a second signal processing model. The training unit trains a third signal processing model by minimizing a first cost including a first error between the first output and a third output, so that the combination of the second signal processing model and the
(Continued)

third signal processing model can simulate the behaviors of the first signal processing model on the first sample set. The third output is an output of the third signal processing model in response to an input including the second output.

12 Claims, 6 Drawing Sheets

(51) Int. Cl.
*G06N 3/04* (2006.01)
*G10L 25/81* (2013.01)

(56) References Cited

U.S. PATENT DOCUMENTS

| | | |
|---|---|---|
| 7,305,669 B2 | 12/2007 | Roush |
| 8,095,823 B2 | 1/2012 | Griffith |
| 8,453,138 B2 | 5/2013 | Meller |
| 8,719,810 B2 | 5/2014 | Oh |
| 8,782,666 B2 | 7/2014 | Kawamoto |
| 9,842,605 B2 | 12/2017 | Lu |
| 10,354,184 B1* | 7/2019 | Vitaladevuni ...... G06Q 30/0251 |
| 2008/0228576 A1 | 9/2008 | Yonezaki |
| 2009/0076628 A1 | 3/2009 | Smith |
| 2009/0157571 A1* | 6/2009 | Smith .................. G06K 9/6292 706/12 |
| 2010/0228548 A1 | 9/2010 | Liu |
| 2010/0287125 A1 | 11/2010 | Okubo |
| 2012/0054731 A1 | 3/2012 | Aravamudan |
| 2014/0013315 A1 | 1/2014 | Genevski |
| 2015/0324690 A1* | 11/2015 | Chilimbi .................. G06N 3/08 706/25 |
| 2016/0110642 A1* | 4/2016 | Matsuda .................. G06N 3/04 706/25 |

FOREIGN PATENT DOCUMENTS

| | | |
|---|---|---|
| WO | 2014/040424 | 3/2014 |
| WO | 2014/160678 | 10/2014 |

OTHER PUBLICATIONS

McCamant, S. et al "Early Identification of Incompatibilities in Multi-Component Upgrades" ECOOP 2004-Object Oriented Programming, Springer Berlin Heidelberg, pp. 440-464, 2004.

Ponomarenko, A. et al "Automatic Backward Compatibility Analysis of Software Component Binary Interfaces" EEE International Conference on Computer Science and Automation Engineering, Jun. 10-12, 2011, pp. 167-173.

Ajmani, Sameer Automatic Software Upgrades for Distributed Systems (PhD Thesis) Computer Science and Artificial Intelligence Laboratory Technical Report, Oct. 6, 2005.

McCamant, S. et al "Predicting Problems Caused by Component Upgrades" Proc. of the 9th European Software Engineering Conference, pp. 287-296, Mar. 2004.

Mariani, L. et al "A Technique for Verifying Component-Based Software" Elsevier, Electronic Notes in Theoretical Computer Science, 2005.

Valenta, L. et al "Automated Generating of OSGi Component Versions" Proc. of ECI, vol. 6, publication date: Unknown.

Kim, Dong Kwan, et al "Dynamic Reconfiguration for Java Applications Using AOP" Proc. of 24th International Conference on Distributed Computing Systems workshops, pp. 210-215, Apr. 3-6, 2008.

Bialek, R. et al. "A Framework for Evolutionary, Dynamically Updatable, Component-Based Systems" Proc. 24th International Conference on Distributed Computing Systems Workshops, Mar. 23-24, 2004, pp. 1-6.

Zechao, L. et al "MLRank: Multi-Correlation Learning to Rank for Image Annotation" Pattern Recognition, Elsevier, vol. 46, No. 10, Apr. 6, 2013, pp. 2700-2710.

Moura, Jose "What is Signal Processing?" IEEE Signal Processing Magazine, vol. 26, No. 6, Nov. 1, 2009, p. 6.

* cited by examiner

TRAINING SIGNAL PROCESSING MODEL FOR COMPONENT REPLACEMENT IN SIGNAL PROCESSING SYSTEM

CROSS-REFERENCE TO RELATED APPLICATIONS

This application claims priority from Chinese patent application No. 201510224704.1 filed May 5, 2015 and U.S. Provisional Patent Application No. 62/164,764 filed May 21, 2015, which are hereby incorporated by reference in their entirety.

TECHNICAL FIELD

Example embodiments disclosed herein relates generally to signal processing based on machine learning. More specifically, example embodiments relate to training signal processing models for component replacement in signal processing systems.

BACKGROUND

Machine learning is a technique that is concerned with developing algorithms that help computers learn and has been widely used in the field of signal processing. Signal processing deals with the processing of various types of signals such as audio, image and video signals. Such algorithms operate by building or training a signal processing model from example inputs (also called samples or training data) and using that to make predictions or decisions rather than following strictly static program instructions.

Example applications of the signal processing based on machine learning include, but are not limited to, spam filtering, optical character recognition, face detection, spoken language understanding, object or content classification, voice activity detection, and the like. Such applications are usually implemented as components executed based on a trained signal processing model in signal processing systems. As an example, an audio content identifier (or classifier) trained based on samples can be widely used in audio systems such as an audio codec, a voice communication system, a loudness measurement system, or an audio processing systems to identify different audio contents such as dialog or music.

In order to improve the system or better satisfy users' requirement, it is often required to deploy a new component based on a new signal processing model to replace or update a component based on an old signal processing model in a signal processing system. However, it is usually not trivial to simply replace an old component with a new component because the whole system may not work after the component replacement. In general, after a component is replaced or updated, the processing components at subsequent stages in the system and/or the higher-level applications/systems that call and utilize the output of this system may also need corresponding refinement or tuning. Moreover, the unit test design for the original conformance testing may not be suitable anymore. As such, this component swap may introduce a significant amount of extra efforts in order to fully integrate the new component.

SUMMARY

According to an example embodiment disclosed herein, there is provided a method of training a third signal processing model by way of a machine learning method. The method includes the steps of a) calculating a first output from each first sample in a first sample set based on a first signal processing model; b) calculating a second output from the first sample based on a second signal processing model; and c) training a third signal processing model by minimizing a first cost including a first error between the first output and a third output, so that the combination of the second signal processing model and the third signal processing model can simulate the behavior of the first signal processing model on the first sample set, wherein the third output is an output of the third signal processing model in response to an input including the second output.

According to another example embodiment disclosed herein, there is provided a method of training a third signal processing model by way of a machine learning method. The method includes the steps of: a) acquiring a candidate set as a result of adding into an initial set one or more of sample sets which have not been added into the initial set; b) training a third signal processing model by calculating a second output from each sample in the candidate set based on a second signal processing model and minimizing a first cost including an error calculated for each of the samples in the candidate set, so that the combination of the second signal processing model and the third signal processing model can simulate the behavior of a first signal processing model, wherein if the sample belongs to a sample set identified as a first type, the error is calculated as a difference between a first output calculated from the sample based on the first signal processing model, and a third output of the third signal processing model in response to an input including the second output, and if the sample belongs to a sample set identified as a second type, the error is calculated as a difference between a reference output and the third output; c) calculating an average of the errors calculated for the samples in the candidate set; and d) if the average is lower than a initial average associated with the initial set, setting the candidate set as the initial set, setting the average as the initial average and continuing to execute step a), and if the average is not lower than the initial average, continuing to execute step a).

According to yet another example embodiment disclosed herein, there is provided a device for training a third signal processing model by way of a machine learning method. The device includes: a first calculating unit configured to calculate a first output from each first sample in a first sample set based on a first signal processing model; a second calculating unit configured to calculate a second output from the first sample based on a second signal processing model; and a training unit configured to train a third signal processing model by minimizing a first cost including a first error between the first output and a third output, so that the combination of the second signal processing model and the third signal processing model can simulate the behaviors of the first signal processing model on the first sample set, wherein the third output is an output of the third signal processing model in response to an input including the second output.

According to yet another example embodiment disclosed herein, there is provided a device for training a third signal processing model by way of a machine learning method. The device includes: a generating unit configured to acquire a candidate set as a result of adding into an initial set one or more of sample sets which have not been added into the initial set; a training unit configured to, in response to the acquired candidate set, train a third signal processing model by calculating a second output from each sample in the candidate set based on a second signal processing model, and minimizing a first cost including an error calculated for each of the samples in the candidate set, so that the combination of the second signal processing model and the third signal processing model can simulate the behavior of a first signal processing model, wherein if the sample belongs to a sample set identified as a first type, the error is calculated as a difference between a first output calculated from the sample based on the first signal processing model, and a third output of the third signal processing model in response to an input including the second output, and if the sample belongs to a sample set identified as a second type, the error is calculated as a difference between a reference output and the third output; and an evaluator configured to, in response to the trained third signal processing model, calculate an average of the errors calculated for the samples in the candidate set; and if the average is lower than a initial average associated with the initial set, set the candidate set as the initial set, set the average as the initial average and cause the generating unit to acquire another candidate set, and if the average is not lower than the initial average, cause the generating unit to acquire another candidate set.

According to yet another example embodiment disclosed herein, there is provided a device for training a third signal processing model by way of a machine learning method. The device includes: one or more processors for executing instructions so as to perform operations of: a) calculating a first output from each first sample in a first sample set based on a first signal processing model; b) calculating a second output from the first sample based on a second signal processing model; and c) training a third signal processing model by minimizing a first cost including a first error between the first output and a third output, so that the combination of the second signal processing model and the third signal processing model can simulate the behavior of the first signal processing model on the first sample set, wherein the third output is an output of the third signal processing model in response to an input including the second output.

According to yet another example embodiment disclosed herein, there is provided a device for training a third signal processing model by way of a machine learning method. The device includes: one or more processors for executing instructions so as to perform operations of: a) acquiring a candidate set as a result of adding into an initial set one or more of sample sets which have not been added into the initial set; b) training a third signal processing model by calculating a second output from each sample in the candidate set based on a second signal processing model, and minimizing a first cost including an error calculated for each of the samples in the candidate set, so that the combination of the second signal processing model and the third signal processing model can simulate the behavior of a first signal processing model, wherein if the sample belongs to a sample set identified as a first type, the error is calculated as a difference between a first output calculated from the sample based on the first signal processing model, and a third output of the third signal processing model in response to an input including the second output, and if the sample belongs to a sample set identified as a second type, the error is calculated as a difference between a reference output and the third output; c) calculating an average of the errors calculated for the samples in the candidate set; and d) if the average is lower than a initial average associated with the initial set, setting the candidate set as the initial set, setting the average as the initial average and continuing to execute step a), and if the average is not lower than the initial average, continuing to execute step a).

Further features and advantages of example embodiments disclosed herein, as well as the structure and operation of the various embodiments are described in detail below with reference to the accompanying drawings. It is noted that this disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF DRAWINGS

Example embodiments disclosed herein are illustrated by way of example, and not by way of limitation, in the figures of the accompanying drawings and in which like reference numerals refer to similar elements and in which.

DETAILED DESCRIPTION

The example embodiments disclosed herein are below described by referring to the drawings. It is to be noted that, for purpose of clarity, representations and descriptions about those components and processes known by those skilled in the art but unrelated to the example embodiments are omitted in the drawings and the description.

As will be appreciated by one skilled in the art, aspects of the example embodiments may be embodied as a system, method or computer program product. Accordingly, aspects of the example embodiment may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the example embodiment may take the form of a computer program product embodied in one or more computer readable medium(s) having computer readable program code embodied thereon. The computer program may, for example, be distributed across a computer network or located on one or more remote servers or embedded in a device in memory.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, and the like, or any suitable combination of the foregoing.

Computer program code for carrying out operations for aspects of the example embodiments disclosed herein may be written in any combination of one or more programming languages, including an object oriented programming language such as Java, Smalltalk, C++ or the like and conventional procedural programming languages, such as the "C" programming language or similar programming languages.

Aspects of the example embodiments disclosed here are described below with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Depending on different reasons, there are needs to deploy a new component based on a new signal processing model to replace the old component based on the old signal processing model. The reasons include, for example, applying new technologies to improve performance and user experience, lowering computational complexity to reduce computation and electricity consumption in embedded systems, and adopting a new design to incorporate previous small modifications or patches so as to reduce the difficulty of maintenance. In this situation, it is desired that the new component can simulate the behavior of the old component as closely as possible, so that the new component can affect other components in the system as little as possible. Behavior is the response of a component (or signal processing model) to various stimuli or inputs. With respect to a component based on a signal processing model, its behavior can be represented by its outputs (also called as the outputs of the signal processing model) in response to its inputs (also called as the inputs of the signal processing model). However, the reasons of deploying a new component can cause an inherent difference in behaviors of the new component and the old component. For example, in case of content identifier, different from the old content identifier, the new content identifier may use different machine learning techniques, or may be trained from a very different training data.

Figure 1:
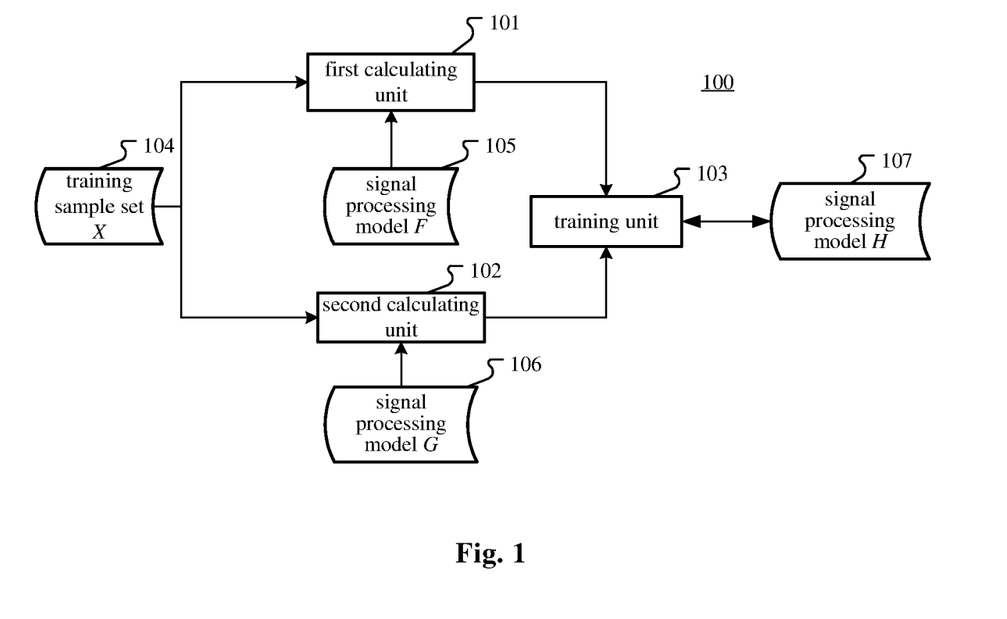
FIG. 1 is a block diagram illustrating an example device for training a mapping signal processing model via a machine learning method according to an example embodiment.

FIG. 1 is a block diagram illustrating an example device 100 for training a mapping signal processing model H via a machine learning method according to an example embodiment.

As illustrated in FIG. 1, the device 100 includes a first calculating unit 101, a second calculating unit 102 and a training unit 103.

The first calculating unit 101 is configured to calculate an output f(x) from each sample x in a sample set X based on a signal processing model F. The second calculating unit 102 is configured to calculate an output g(x) from each sample x based on a signal processing model G.

The training unit 103 is configured to train the signal processing model H by minimizing a cost C including an error $E=|h(g(x))-f(x)|$, so that the combination of the signal processing model G and the signal processing model H can simulate the behavior of the signal processing model F on the sample set X. h( ) is a mapping function based on the signal processing model H.

The first calculating unit 101 reproduces the behavior of an old component to be replaced. The second calculating unit 102 reproduces the behavior of a new component for replacing the old component. The objective of the training unit 103 is to find a mapping h( ) based on the signal processing model H such that the behavior h(g(X)) of the signal processing model G and the signal processing model H can simulate the behavior f(X) of the signal processing model F on the sample set X.

As an example, the signal processing model G represents a new classifier (for example, an audio content classifier) that is trained using the same configuration as the signal processing model F representing an old classifier, for example, by using the same frame length, window length, classification frequency, algorithmic delay, and the like. Moreover, the new classifier can be built separately based on a different training set compared to those used for the old classifier, probably because the old training data is lost of track, and/or new training data needs to be added to cover more use cases or to identify more content types. In this case, f(x) is the output of the old classifier and g(x) is the output of the new classifier, where x is the audio signal being processed. Accordingly, h( ) represents a mapping function based on the signal processing model H that can be found by minimizing the error between h(g(x)) and f(x) on the expected data set X. For example, h( ) can be found according to $$h^* = \mathrm{argmin}_h C, \ C = \int_X |h(g(x)) - f(x)|^2 \qquad (1.1).$$

Figure 2A:
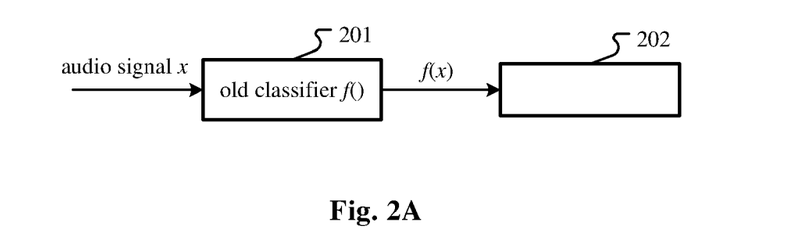
FIG. 2A is a schematic view for illustrating an example signal processing system where an old classifier is deployed.
Figure 2B:
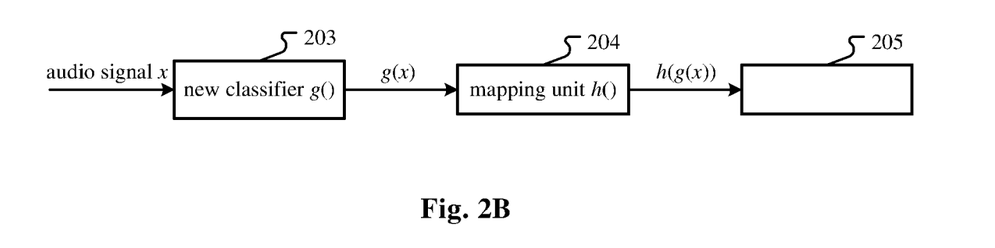
FIG. 2B is a schematic view for illustrating the example signal processing system of FIG. 2A where the old classifier has been replaced by a new classifier.

FIG. 2A is a schematic view for illustrating an example signal processing system where the old classifier is deployed. As illustrated in FIG. 2A, the old classifier 201 processes the audio signal x and supplies its output f(x) to the remaining part 202 of the system. FIG. 2B is a schematic view for illustrating the example signal processing system of FIG. 2A where the old classifier has been replaced by the new classifier. As illustrated in FIG. 2B, the new classifier 203 processes the audio signal x and supplies its output g(x) to the mapping unit 204, the mapping unit 204 converts g(x) to h(g(x)) and supplies it to the remaining part 205 of the system. In the above formula, the outputs f(x) and g(x) from the classifiers are classification results.

The outputs f(x) and g(x) of the signal processing models F and G may include multiple elements. For example, in case of an audio content classifier for multi-label classification, the audio content may be classified into multiple audio content types. In this case, the outputs can be represented by vectors, for example, $$p = [p_1, \ldots, p_N] = f(x) \qquad (2.1)$$

$$q = [q_1, \ldots, q_N] = g(x) \qquad (2.2)$$

where $p_1, \ldots p_N$ and $q_1, \ldots q_N$ are processing results, for example, classification results on N>1 target audio content types obtained by using the old and new classifiers respectively. The values of $p_i$ and $q_i$ can be either 0 or 1, indicating a judgment, for example, if an audio content type is present in the processed audio signal. They can also be a confidence score between 0 and 1 indicating a possibility of event, for example, the probability that the processed audio signal contains a target audio content type.

As an example, in training the signal processing model H, the error E may be calculated as a distance between vectors p and h(q), that is, $E = \|p - h(q)\|$, and the cost C may be calculated as $C = \int_X \|p - h(q)\|^2$.

As another example, the signal processing model H may include a set of signal processing models $H_1, \ldots, H_N$ for implementing mapping functions $h_1( ), \ldots, h_N( )$ respectively. In this case, the output $h(g(x)) = [q_1, \ldots, q_N]$ of the signal processing model H includes $h_1(q_1), \ldots,$ and $h_N(q_N)$, and the signal processing models $H_1, \ldots, H_N$ are trained separately. In training the signal processing model $H_i$, the corresponding error $E_i$ may be calculated as $|p_i - h_i(q_i)|$, and the corresponding cost $C_i$ may be calculated as $C_i = \int_X |p_i - h_i(q_i)|^2$.

Figure 3:
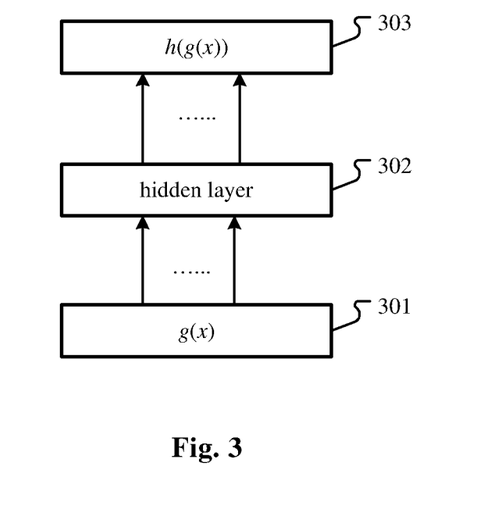
FIG. 3 is a schematic view for illustrating an example signal processing model based on the neural network technique.

The signal processing model H may be trained via various machine learning methods. For example, a machine learning method based on the neural network technique may be used. FIG. 3 is a schematic view for illustrating an example signal processing model H based on the neural network technique. As illustrated in FIG. 3, the signal processing model H includes an input layer 301, a hidden layer 302 and an output layer 303. Arrowed lines between the input layer 301 and the hidden layer 302 and arrowed lines between the hidden layer 302 and the output layer 303 represent connections between nodes (or neurons). Each connection has a weight. During training the signal processing model H, when an output g(x) is calculated based on the signal processing model G, the output g(x) is received by the input layer 301 and transferred to the output layer 303 through the connections so that the output layer 303 derives an output h(g(x)). Then an error E between the output h(g(x)) and an output f(x) calculated based on the signal processing model F is obtained and the weights of the connections are adjusted according to the error E according to a learning algorithm such as the backward propagation (BP) algorithm. In this way, the signal processing model H based on the neural network technique can be trained. Alternatively, both of the output g(x) and the sample x may be received by the input layer 301 as its input.

Figure 4:
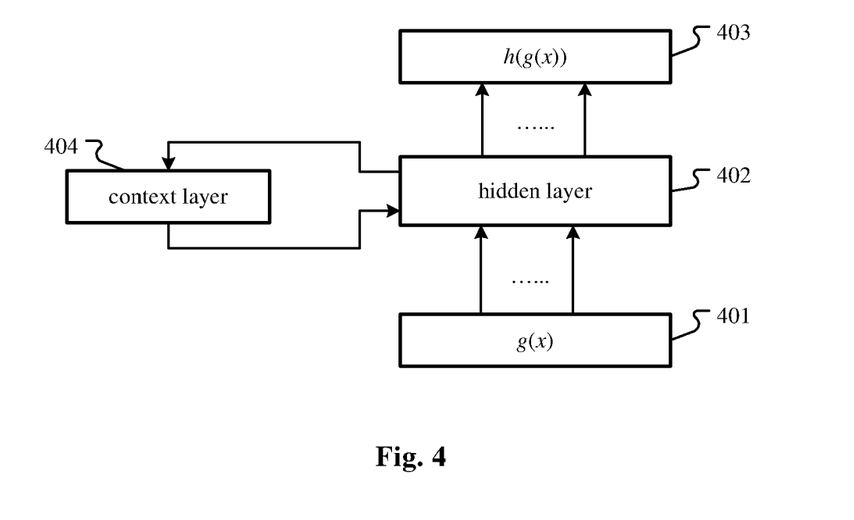
FIG. 4 is a schematic view for illustrating another example signal processing model based on the neural network technique.

FIG. 4 is a schematic view for illustrating another example signal processing model H based on the neural network technique. As illustrated in FIG. 4, the signal processing model H includes an input layer 401, a hidden layer 402, an output layer 403 and a context layer 404. Arrowed lines between the input layer 401 and the hidden layer 402, arrowed lines between the hidden layer 402 and the output layer 403, and arrowed lines from the context layer to the hidden layer 402 represent connections between nodes (or neurons). Each connection has a weight. Considering that the processing results of the signal processing model H may be correlated or continuous at least for a short period, the context layer 404 is incorporated. The states in processing the previous sample (e.g. a frame) can be transferred from the hidden layer 402 and stored in the context layer 404. In processing the current sample, the states stored in the context layer 404 can be transferred to the hidden layer 402 and used for processing the current sample. This neural network is a recurrent neural network such as Elman Network. During training the signal processing model H, when an output g(x) is calculated based on the signal processing model G, the output g(x) is received by the input layer 401 and transferred to the output layer 403 through the connections so that the output layer 403 derives an output h(g(x)). Then an error E between the output h(g(x)) and an output f(x) calculated based on the signal processing model F is obtained and the weights of the connections are adjusted according to the error E according to a learning algorithm such as the backward propagation (BP) algorithm. In this way, the signal processing model H based on the neural network technique can be trained. Alternatively, both of the output g(x) and the sample x may be received by the input layer 301 as its input.

In the case where outputs f(x) and g(x) of the signal processing models F and G are vectors p and q including N elements representing confidence scores as illustrated in formula (2.1) and (2.2), the signal processing model H may be implemented as a N×N matrix H. By this way, the error E may be calculated as a distance between vectors p and qH, that is, $E=\|p-qH\|$, and the cost C may be calculated as $C=\int_X \|p-qH\|^2$. The formula (1.1) can be rewrote as $$H^*=\text{argmin}_H C, \; C=\int_X \|p-qH\|^2 \qquad (1.2).$$

Practically, H can be estimated by different methods, for example, by using least squares and greedy descent.

In another example, the signal processing model H may be implemented as a mapping H:

$$H=(Q^TQ)^{-1}Q^TP \qquad (3.1),$$

where P and Q are M×N matrices, M is the number of all the samples $x_i$ in the sample set $X=\{x_1, \ldots, x_M\}$, each row $[p_{i,1}, \ldots, p_{i,N}]$ of P is an output $f(x_i)$ calculated from the sample $x_i$ in the sample set X, and each row $[q_{i,1}, \ldots, q_{i,N}]$ of Q is an output $g(x_i)$ calculated from the sample $x_i$ in the sample set X.

In yet another example, the signal processing model H may be implemented as a mapping H:

$$H=(Q^TQ+r)^{-1}Q^TP \qquad (3.2),$$

where P and Q are M×N matrices, M is the number of all the samples $x_i$ in the sample set $X=\{x_1, \ldots, x_M\}$, each row $[p_{i,1}, \ldots, p_{i,N}]$ of P is an output $f(x_i)$ calculated from the sample $x_i$ in the sample set X, each row $[q_{i,1}, \ldots, q_{i,N}]$ of Q is an output $g(x_i)$ calculated from the sample $x_i$ in the sample set X, and r is a regularization term for smoothing the mapping or avoiding over-fitting in the training process. For example, by using the Ridge regularization, the regularization term $r=\lambda I$, where $\lambda$ is a parameter controlling the smoothness, and I is an identity matrix. A larger value of $\lambda$ means a smoother but a more biased mapping.

The signal processing model H may also be implemented as various forms of linear or nonlinear functions such as linear function, polynomial function, and sigmoid function. The optimal parameters of these functions can be estimated by minimizing the error.

Figure 5:
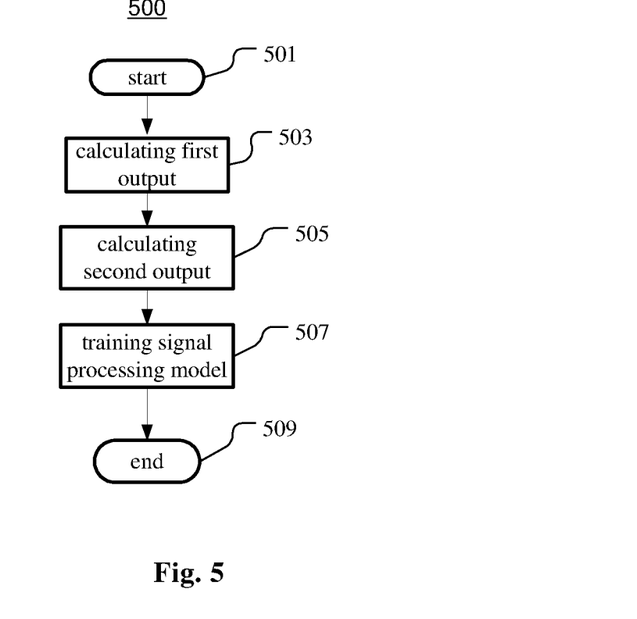
FIG. 5 is a flow chart for illustrating an example method of training a mapping signal processing model via a machine learning method according to an example embodiment.

FIG. 5 is a flow chart for illustrating an example method 500 of training a mapping signal processing model H via a machine learning method according to an example embodiment.

As illustrated in FIG. 5, the method 500 starts from step 501. At step 503, an output f(x) is calculated from each sample x in a sample set X based on a signal processing model F. At step 503, an output g(x) is calculated from each sample x based on a signal processing model G.

At step 507, a signal processing model H is trained by minimizing a cost C including an error $E=|h(g(x))-f(x)|$, so that the combination of the signal processing model G and the signal processing model H can simulate the behavior of the signal processing model F on the sample set X. h( ) is a mapping function based on the signal processing model H. Then the method 500 ends at step 509.

The behavior of an old component to be replaced is reproduced at step 503. The behavior of a new component for replacing the old component is reproduced at step 505. The objective of the training at step 507 is to find a mapping h( ) based on the signal processing model H such that the behavior h(g(X)) of the signal processing model G and the signal processing model H can simulate the behavior f(X) of the signal processing model F on the sample set X.

Although steps 503, 505 and 507 are illustrated in FIG. 5 as being performed sequentially, the calculation of g(x) and f(x) for individual samples x in steps 503 and 505 may be executed at any timing required by the training at the step 507. For example, the calculation of g(x) for an individual sample x may be executed immediately before the calculation of h(g(x)).

Further to the above embodiments, the mapping function h( ) based on the signal processing model H may be also content dependent. That is to say, the input to the mapping function h( ) (signal processing model H) includes the output g(x) calculated based on the signal processing model G and the signal x.

Figure 6:
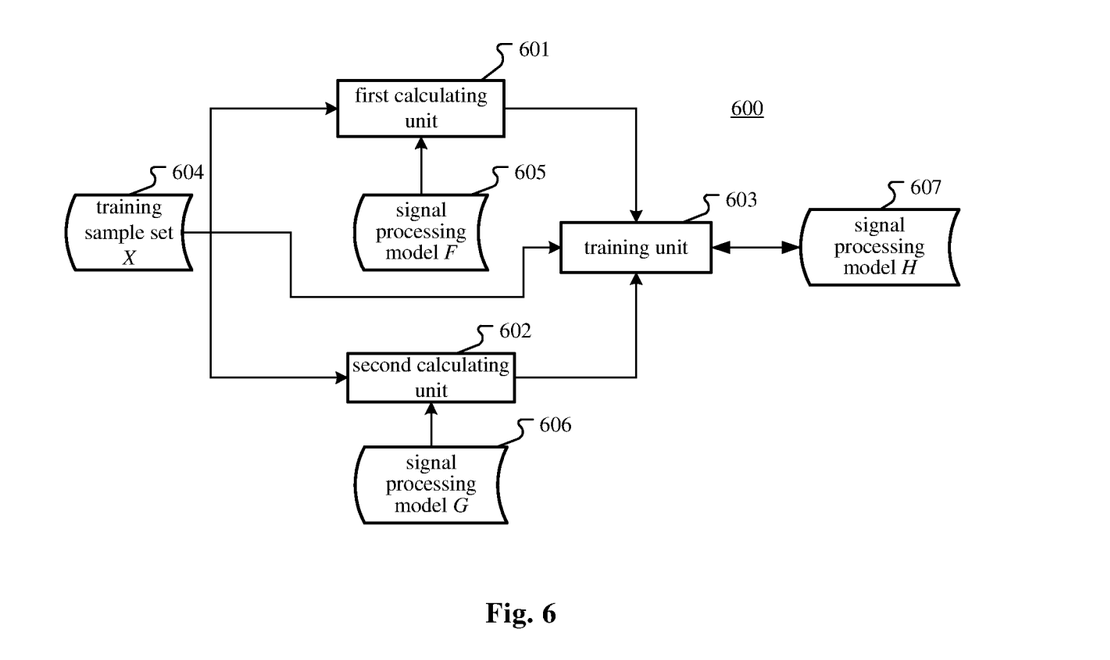
FIG. 6 is a block diagram illustrating an example device for training a mapping signal processing model via a machine learning method according to an example embodiment.

FIG. 6 is a block diagram illustrating an example device 600 for training a mapping signal processing model H via a machine learning method according to an example embodiment, wherein the mapping signal processing model H is content dependent.

As illustrated in FIG. 6, the device 600 includes a first calculating unit 601, a second calculating unit 602 and a training unit 603. The first calculating unit 601 and second calculating unit 602 have the same functions with the first calculating unit 101 and second calculating unit 102 respectively, and will be described in detail herein.

The training unit 603 is configured to train the signal processing model H by minimizing a cost C including an error $E=|h(g(x), x)-f(x)|$, so that the combination of the signal processing model G and the signal processing model H can simulate the behavior of the signal processing model F on the sample set X. h( ) is a mapping function based on the signal processing model H. The input to the function h( ) includes g(x) and x.

In a further embodiment of the method 500, the step 507 includes training the signal processing model H by minimizing a cost C including an error $E=|h(g(x), x)-f(x)|$, so that the combination of the signal processing model G and the signal processing model H can simulate the behavior of the signal processing model F on the sample set X. In this situation, the input to the function h( ) includes g(x) and x.

As indicated in the above, it is desired that the new component can simulate the behavior of the old component as closely as possible, so that the new component can affect other components in the system as little as possible. Besides training the signal processing model H to refine the output g( ) of the new component based on the signal processing model G, the behavior of the old component based on the signal processing model F can be also considered when training the signal processing model G. This can be achieved by labeling the training sample with the output f( ) of the old component based on the signal processing model F. In this way, when training the signal processing model G, the behavior of the signal processing model F is inherently considered in the training process, so that the corresponding output of the signal processing model G can be more close to that of the signal processing model F.

In a further embodiment of the device 100 or 600, the training unit 103 or 603 may be further configured to train the signal processing model G by minimizing a cost C' including an error $E_i'$ between an output $f(z_i)$ calculated from each sample $z_i$ in a sample set Z based on the signal processing model F and another output $g(z_i)$ calculated from the same sample $z_i$ based on the signal processing model G. The sample set Z may be prepared separately, and thus is not necessarily identical to the sample sets for training the signal processing models F and H. During the training, the training unit 103 or 603 may calculate the output $f(z_i)$ through the first calculating unit 101 or first calculating unit 601, calculate the output $g(z_i)$ through the calculating unit 102 or 602. Alternatively, the outputs $f(z_i)$ and/or $g(z_i)$ may be calculated by the training unit 103 or 603 itself.

In a further embodiment of the method 500, the method 500 may further comprise a step of training the signal processing model G by minimizing a cost C' including an error $E_i'$ between an output $f(z_i)$ calculated from each sample $z_i$ in a sample set Z based on the signal processing model F and another output $g(z_i)$ calculated from the same sample $z_i$ based on the signal processing model G. The sample set Z may be prepared separately, and thus is not necessarily identical to the sample sets for training the signal processing models F and H. During this step of training, the output $f(z_i)$ may be calculated at step 503, and the output $g(z_i)$ may be calculated at step 505. Alternatively, the outputs $f(z_i)$ and/or $g(z_i)$ may also be calculated at a step other than steps 503 and 505.

In some situations, it is desired that the new signal processing model G can simulate the behavior (old behavior) of the old signal processing model F on some dataset, but can present a different behavior (new behavior) than the old signal processing model F on other dataset. For example, in case of the audio content classifier, the old signal processing model F works well in identifying speech, but is not suitable to identify music. To meet the requirement of identifying both speech and music, the new signal processing model G is trained. As another example, some samples are manually labeled, and the new signal processing model G is trained based on these samples so as to have better performance on dataset represented by these samples. In this case, there is a trade-off between simulating the old behavior and keeping the new behavior in training the mapping signal processing model H.

Figure 7:
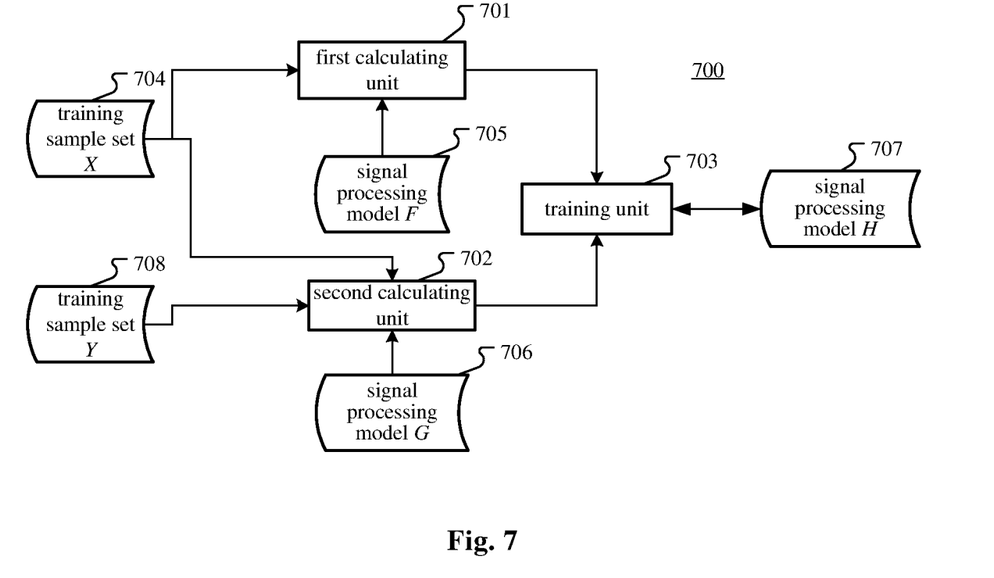
FIG. 7 is a block diagram illustrating an example device for training a mapping signal processing model via a machine learning method according to an example embodiment.

FIG. 7 is a block diagram illustrating an example device 700 for training a mapping signal processing model H via a machine learning method according to an example embodiment.

As illustrated in FIG. 7, the device 700 includes a first calculating unit 701, a second calculating unit 702 and a training unit 703. The first calculating unit 701 has the same function as the first calculating unit 101, as such it will not be described in detail herein.

The second calculating unit 702 includes the function of the second calculating unit 102. The second calculating unit 702 is further configured to calculate an output $g(y)$ from each sample y in a sample set Y based on the signal processing model G. The signal processing model G and the signal processing model F can have different behaviors on the sample set Y.

The training unit 703 has the same function with the training unit 103 or 603 except that the cost C including the error $E_1=|h(g(x))-f(x)|$ and another error $E_2=|h(g(y))-l(y)|$, where $l(y)$ is a reference output such as a manually labeled result. In this case, the mapping function $h(\ )$, and thus, the signal processing model H can be derived according to the following objective function:

$$h^*=\mathrm{argmin}_h C, \ C=\int_X |h(g(x))-f(x)|^2 + \int_Y |h(g(y))-l(y)|^2 \quad (1.3)$$

Further, the cost C may be a weighted sum of the errors $E_1$ and $E_2$. For example, the cost C may be calculated as $$C = \alpha \int_X |h(g(x))-f(x)|^2 + \beta \int_Y |h(g(y))-l(y)|^2 \quad (1.4)$$

where X and Y are two dataset which can be the same, overlapped or independent, $\alpha$ and $\beta$ are weights for the errors $E_1$ and $E_2$, typically between 0 and 1.

In a further embodiment of the method 500, step 505 further comprises calculating an output $g(y)$ from each sample y in a sample set Y based on the signal processing model G. The signal processing model G and the signal processing model F can have different behaviors on the sample set Y. In the training of step 507, the cost C includes the error $E_1=|h(g(x))-f(x)|$ and another error $E_2=|h(g(y))-l(y)|$, where $l(y)$ is a reference output such as a manually labeled result. In this case, the mapping function $h(\ )$, and thus, the signal processing model H can be derived according to the formula (1.3).

In the above embodiments relating to the trade-off between simulating the old behavior and keeping the new behavior in training the mapping signal processing model H, the signal processing model H may be implemented as a mapping H:

$$H=(\alpha Q_X^T Q_X + \beta Q_Y^T Q_Y)^{-1}(\alpha Q_X^T P_X + \beta Q_Y^T L_Y),$$

where $\alpha$ and $\beta$ are weights, $P_X$ and $Q_X$ are M×N matrices, M is the number of the samples $x_i$ in the sample set X, each row $[p_{i,1}, \ldots, p_{i,N}]$ of $P_X$ is an output $f(x_i)$ calculated from the sample $x_i$ in the sample set X, and each row $[q_{i,1}, \ldots, q_{i,N}]$ of $Q_X$ is an output $g(x_i)$ calculated from the sample $x_i$ in the sample set X, and $L_Y$ and $Q_Y$ are K×N matrices, K is the number of the samples $y_i$ in the sample set Y, each row $[l_{i,1}, \ldots, l_{i,N}]$ of $L_Y$ is one of the reference outputs for all the samples $y_i$ in the sample set Y, and each row $[q'_{i,1}, \ldots, q'_{i,N}]$ of $Q_Y$ is an output $g(y_i)$ calculated from the sample $y_i$ in the sample set Y.

It should be noted that, although two sample sets X and Y are used in training the signal processing model H, any of the sample sets X and Y may comprise more than one sample sets which can be assigned with corresponding weights for their errors calculated in the training.

There can be many sample sets which are labeled manually or by the output $f(\ )$ based on the old signal processing model F. Signal processing models H trained based on different combinations of these sample sets may have different performances. It is desired to find the combination to train a signal processing model H having better performance FIG. 8 is a block diagram illustrating an example device 800 for training a mapping signal processing model H via a machine learning method according to an example embodiment.

Figure 8:
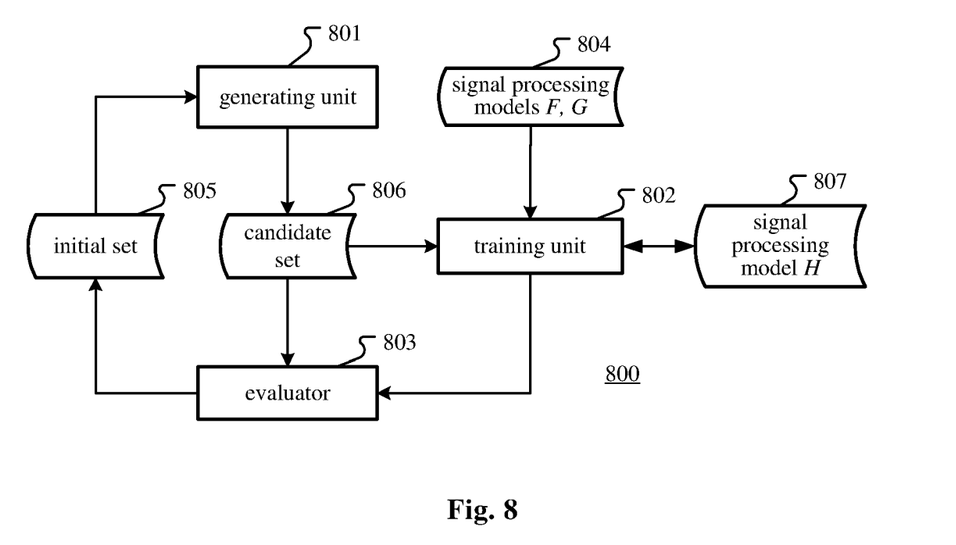
FIG. 8 is a block diagram illustrating an example device for training a mapping signal processing model via a machine learning method according to an example embodiment.

As illustrated in FIG. 8, the device 800 includes a generating unit 801, a training unit 802 and an evaluator 803.

The generating unit 801 is configured to acquire a candidate set $S=\{S_1, \ldots, S_L\}$ as a result of adding into an initial set I one or more of sample sets which have not been added into the initial set I. $S_1, \ldots, S_L$ represent the sample sets in the candidate set S. At the beginning, the initial set I may be empty, or include one or more preset sample sets.

In response to the candidate set S acquired by the generating unit 801, the training unit 802 is configured to train a signal processing model H by calculating an output $g(x)$ from each sample x in the candidate set S based on a signal processing model G, and minimizing a cost C including an error E calculated for each of the samples in the candidate set S, so that the combination of the signal processing model G and the signal processing model H can simulate the behavior of a signal processing model F.

In the training, if the sample x belongs to a sample set identified as labeled by the output $f(x)$ based on the signal processing model F, the error E is calculated as a difference between the output $f(x)$ and an output $h(g(x))$ of the signal processing model H. If the sample x belongs to a sample set identified as manually labeled, the error E is calculated as a difference between a reference output $l(x)$ and the output $h(g(x))$.

In response to the signal processing model H trained by the training unit 802, the evaluator 803 is configured to calculate an average of the errors calculated for the samples in the candidate set S. If the average is lower than an initial average associated with the initial set, the evaluator 803 is configured to assign the candidate set S to the initial set I, and assign the average to the initial average. In this case, the evaluator 803 is configured to cause the generating unit 801 to acquire a new candidate set so that another signal processing model H is trained by the training unit 802 based on the new candidate set. If the average is not lower than the initial average, the evaluator 803 is configured to cause the generating unit 801 to acquire another candidate set. In this case, the candidate set S is ignored and the generating unit 801 acquires another candidate set based on the initial set.

When the generating unit 801 acquires another candidate set, those sample sets which have ever been added into any previous candidate set will not be added into the initial set.

Figure 9:
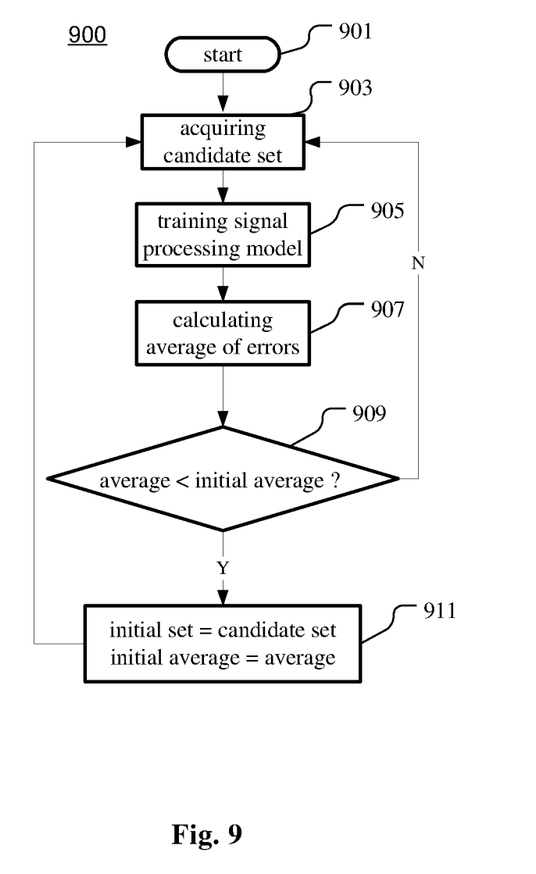
FIG. 9 is a flow chart for illustrating an example method of training a mapping signal processing model via a machine learning method according to an example embodiment.

FIG. 9 is a flow chart for illustrating an example method 900 of training a mapping signal processing model H via a machine learning method according to an example embodiment.

As illustrated in FIG. 9, the method 900 starts from step 901. At step 903, a candidate set $S=\{S_1, \ldots, S_L\}$ is acquired as a result of adding into an initial set I one or more of sample sets which have not been added into the initial set I. $S_1, \ldots, S_L$ represent the sample sets in the candidate set S. At the beginning, the initial set I may be empty, or include one or more preset sample sets.

At step 905, a signal processing model H is trained by calculating an output $g(x)$ from each sample x in the candidate set S based on a signal processing model G, and minimizing a cost C including an error E calculated for each of the samples in the candidate set S, so that the combination of the signal processing model G and the signal processing model H can simulate the behavior of a signal processing model F.

In the training, if the sample x belongs to a sample set identified as labeled by the output $f(x)$ based on the signal processing model F, the error E is calculated as a difference between the output $f(x)$ and an output $h(g(x))$ of the signal processing model H. If the sample x belongs to a sample set identified as manually labeled, the error E is calculated as a difference between a reference output $l(x)$ and the output $h(g(x))$.

At step 907, an average of the errors calculated for the samples in the candidate set S is calculated.

At step 909, a comparison is made between the average and an initial average associated with the initial set. If the average is lower than the initial average, at step 911, the candidate set S is assigned to the initial set I (e.g., I=S), the average is assigned to the initial average, and the method 900 returns to step 903. If the average is not lower than the initial average, the method 900 returns to step 903.

At step 903, when acquiring another candidate set, those sample sets which have ever been added into any previous candidate set will not be added into the initial set. If there is no sample set which can be added, the method 900 ends.

When the method ends, the signal processing model H trained based on the last candidate set which is not ignored becomes the final result.

Figure 10:
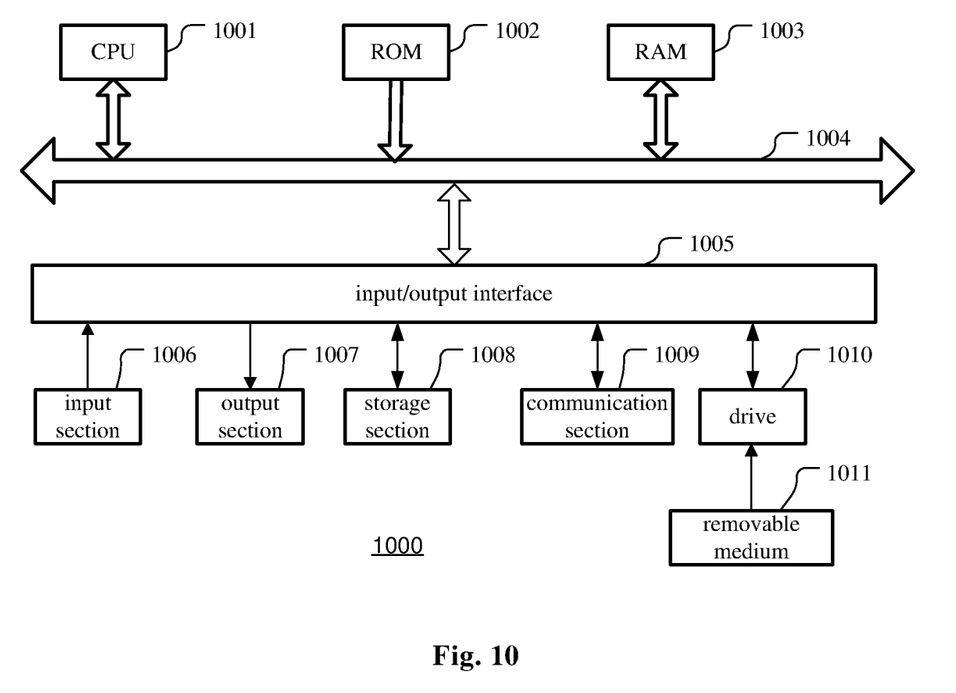
FIG. 10 is a block diagram illustrating an exemplary system for implementing the aspects of the example embodiments disclosed herein.

FIG. 10 is a block diagram illustrating an exemplary system for implementing the aspects of the example embodiments disclosed herein.

In FIG. 10, a central processing unit (CPU) 1001 performs various processes in accordance with a program stored in a read only memory (ROM) 1002 or a program loaded from a storage section 1008 to a random access memory (RAM) 1003. In the RAM 1003, data required when the CPU 1001 performs the various processes or the like is also stored as required.

The CPU 1001, the ROM 1002 and the RAM 1003 are connected to one another via a bus 1004. An input/output interface 1005 is also connected to the bus 1004.

The following components are connected to the input/output interface 1005: an input section 1006 including a keyboard, a mouse, or the like; an output section 1007 including a display such as a cathode ray tube (CRT), a liquid crystal display (LCD), or the like, and a loudspeaker or the like; the storage section 1008 including a hard disk or the like; and a communication section 1009 including a network interface card such as a LAN card, a modem, or the like. The communication section 1009 performs a communication process via the network such as the internet.

A drive 1010 is also connected to the input/output interface 1005 as required. A removable medium 1011, such as a magnetic disk, an optical disk, a magneto-optical disk, a semiconductor memory, or the like, is mounted on the drive 1010 as required, so that a computer program read therefrom is installed into the storage section 1008 as required.

In the case where the above-described steps and processes are implemented by the software, the program that constitutes the software is installed from the network such as the internet or the storage medium such as the removable medium 1011.

The terminology used herein is for the purpose of describing particular embodiments only and is not intended to be limiting of the example embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the example embodiments have been presented for purposes of illustration and description, but is not intended to be exhaustive or limited to the example embodiments in the form disclosed. Many modifications and variations will be apparent to those of ordinary skill in the art without departing from the scope and spirit of the example embodiments. The embodiment was chosen and described in order to best explain the principles of the example embodiments and the practical application, and to enable others of ordinary skill in the art to understand the example embodiments for various embodiments with various modifications as are suited to the particular use contemplated.

The following exemplary embodiments (each referred to as an "EE") are described.

EE 1. A method of training a third signal processing model via a machine learning method, comprising steps of:

a) calculating a first output from each first sample in a first sample set based on a first signal processing model;

b) calculating a second output from the first sample based on a second signal processing model; and c) training a third signal processing model by minimizing a first cost including a first error between the first output and a third output, so that the combination of the second signal processing model and the third signal processing model can simulate the behavior of the first signal processing model on the first sample set, wherein the third output is an output of the third signal processing model in response to an input including the second output.

EE 2. The method according to EE 1, wherein the input includes both the second output and the first sample.

EE 3. The method according to EE 1, wherein the step b) further comprises calculating a fourth output from each second sample in a second sample set based on the second signal processing model, wherein the first signal processing model and the second signal processing model can have different behaviors on the second sample set, the first cost includes the first error and a second error between the fourth output and a reference output.

EE 4. The method according to EE 1, comprising: d) training the second signal processing model by minimizing a second cost including an error between an output calculated from each of samples based on the first signal processing model and another output calculated from the same sample based on the second signal processing model.

EE 5. The method according to EE 1, wherein the first signal processing model and the second signal processing model are models for an audio content classifier.

EE 6. The method according to EE 3, wherein the first cost is a weighted sum of the first error and the second error.

EE 7. The method according to EE 1 or 2, wherein the third signal processing model is implemented as a neural network.

EE 8. The method according to EE 7, wherein the neural network is a recurrent neural network.

EE 9. The method according to EE 1, wherein the third signal processing model is implemented as a mapping H:

$$H=(Q^TQ)^{-1}Q^TP,$$

where P and Q are M×N matrices, M is the number of the first samples in the first sample set, each row of P is one of the first outputs calculated from all the first samples in the first sample set, and each row of Q is one of the second outputs calculated from all the first samples in the first sample set.

EE 10. The method according to EE 1, wherein the third signal processing model is implemented as a mapping H:

$$H=(Q^TQ+r)^{-1}Q^TP,$$

where P and Q are M×N matrices, M is the number of the first samples in the first sample set, each row of P is one of the first outputs calculated from all the first samples in the first sample set, each row of Q is one of the second outputs calculated from all the first samples in the first sample set, and r is a regularization term for smoothing the mapping or avoiding over-fitting in the training process.

EE 11. The method according to EE 3, wherein the third signal processing model is implemented as a mapping H:

$$H=(\alpha Q_X^T Q_X+\beta Q_Y^T Q_Y)^{-1}(\alpha Q_X^T P_X+\beta Q_Y^T L_Y),$$

where
α and β are weights,
$P_X$ and $Q_X$ are M×N matrices, M is the number of the first samples in the first sample set, each row of $P_X$ is one of the first outputs calculated from all the first samples in the first sample set, and each row of $Q_X$ is one of the second outputs calculated from all the first samples in the first sample set, and
$L_Y$ and $Q_Y$ are K×N matrices, K is the number of the second samples in the second sample set, each row of $L_Y$ is one of the reference outputs for all the second samples in the second sample set, and each row of $Q_Y$ is one of the fourth outputs calculated from all the second samples in the second sample set.

EE 12. A method of training a third signal processing model via a machine learning method, comprising steps of:
a) acquiring a candidate set as a result of adding into an initial set one or more of sample sets which have not been added into the initial set;
b) training a third signal processing model by
calculating a second output from each sample in the candidate set based on a second signal processing model, and
minimizing a first cost including an error calculated for each of the samples in the candidate set, so that the combination of the second signal processing model and the third signal processing model can simulate the behavior of a first signal processing model,
wherein if the sample belongs to a sample set identified as a first type, the error is calculated as a difference between a first output calculated from the sample based on the first signal processing model, and a third output of the third signal processing model in response to an input including the second output, and
if the sample belongs to a sample set identified as a second type, the error is calculated as a difference between a reference output and the third output;
c) calculating an average of the errors calculated for the samples in the candidate set; and
d) if the average is lower than a initial average associated with the initial set, setting the candidate set as the initial set, setting the average as the initial average and continuing to execute step a), and if the average is not lower than the initial average, continuing to execute step a).

EE 13. The method according to EE 12, wherein the input includes both the second output and the sample.

EE 14. The method according to EE 12, wherein the first signal processing model and the second signal processing model can have different behaviors on the sample set identified as the second type.

EE 15. The method according to EE 12, comprising: training the second signal processing model by minimizing a second cost including an error between an output calculated from each of samples based on the first signal processing model and another output calculated from the same sample based on the second signal processing model.

EE 16. The method according to EE 12, wherein the first signal processing model and the second signal processing model are models for an audio content classifier.

EE 17. The method according to EE 12, wherein the first cost is a weighted sum of the errors, where the errors calculated for the samples belonging to the same sample set are assigned with the same weight.

EE 18. The method according to EE 17, wherein the errors calculated for the samples belonging to the sample sets identified as the same type are assigned with the same weight.

EE 19. The method according to EE 12, wherein the third signal processing model is implemented as a neural network.

EE 20. The method according to EE 19, wherein the neural network is a recurrent neural network.

EE 21. A device for training a third signal processing model via a machine learning method, comprising:
a first calculating unit configured to calculate a first output from each first sample in a first sample set based on a first signal processing model;

a second calculating unit configured to calculate a second output from the first sample based on a second signal processing model; and a training unit configured to train a third signal processing model by minimizing a first cost including a first error between the first output and a third output, so that the combination of the second signal processing model and the third signal processing model can simulate the behaviors of the first signal processing model on the first sample set, wherein the third output is an output of the third signal processing model in response to an input including the second output.

EE 22. The device according to EE 21, wherein the input includes both the second output and the first sample.

EE 23. The device according to EE 21, wherein the second calculating unit is further configured to calculate a fourth output from each second sample in a second sample set based on the second signal processing model, wherein the first signal processing model and the second signal processing model can have different behaviors on the second sample set, the first cost includes the first error and a second error between the fourth output and a reference output.

EE 24. The device according to EE 21, wherein the training unit is further configured to train the second signal processing model by minimizing a second cost including an error between an output calculated from each of samples based on the first signal processing model and another output calculated from the same sample based on the second signal processing model.

EE 25. The device according to EE 21, wherein the first signal processing model and the second signal processing model are models for an audio content classifier.

EE 26. The device according to EE 23, wherein the first cost is a weighted sum of the first error and the second error.

EE 27. The device according to EE 21 or 22, wherein the third signal processing model is implemented as a neural network.

EE 28. The device according to EE 27, wherein the neural network is a recurrent neural network.

EE 29. The device according to EE 21, wherein the third signal processing model is implemented as a mapping H:

$$H=(Q^TQ)^{-1}Q^TP,$$

where P and Q are M×N matrices, M is the number of the first samples in the first sample set, each row of P is one of the first outputs calculated from all the first samples in the first sample set, and each row of Q is one of the second outputs calculated from all the first samples in the first sample set.

EE 30. The device according to EE 21, wherein the third signal processing model is implemented as a mapping H:

$$H=(Q^TQ+r)^{-1}Q^TP,$$

where P and Q are M×N matrices, M is the number of the first samples in the first sample set, each row of P is one of the first outputs calculated from all the first samples in the first sample set, and each row of Q is one of the second outputs calculated from all the first samples in the first sample set, and r is a regularization term for smoothing the mapping or avoiding over-fitting in the training process.

EE 31. The device according to EE 23, wherein the third signal processing model is implemented as a mapping H:

$$H=(\alpha Q_X^T Q_X + \beta Q_Y^T Q_Y)^{-1}(\alpha Q_X^T P_X + \beta Q_Y^T L_Y),$$

where $\alpha$ and $\beta$ are weights, $P_X$ and $Q_X$ are M×N matrices, M is the number of the first samples in the first sample set, each row of $P_X$ is one of the first outputs calculated from all the first samples in the first sample set, and each row of $Q_X$ is one of the second outputs calculated from all the first samples in the first sample set, and $L_Y$ and $Q_Y$ are K×N matrices, K is the number of the second samples in the second sample set, each row of $L_Y$ is one of the reference outputs for all the second samples in the second sample set, and each row of $Q_Y$ is one of the fourth outputs calculated from all the second samples in the second sample set.

EE 32. A device for training a third signal processing model via a machine learning method, comprising:

a generating unit configured to acquire a candidate set as a result of adding into an initial set one or more of sample sets which have not been added into the initial set;

a training unit configured to, in response to the acquired candidate set, train a third signal processing model by calculating a second output from each sample in the candidate set based on a second signal processing model, and minimizing a first cost including an error calculated for each of the samples in the candidate set, so that the combination of the second signal processing model and the third signal processing model can simulate the behavior of a first signal processing model, wherein if the sample belongs to a sample set identified as a first type, the error is calculated as a difference between a first output calculated from the sample based on the first signal processing model, and a third output of the third signal processing model in response to an input including the second output, and if the sample belongs to a sample set identified as a second type, the error is calculated as a difference between a reference output and the third output; and an evaluator configured to, in response to the trained third signal processing model, calculate an average of the errors calculated for the samples in the candidate set; and if the average is lower than a initial average associated with the initial set, set the candidate set as the initial set, set the average as the initial average and cause the generating unit to acquire another candidate set, and if the average is not lower than the initial average, cause the generating unit to acquire another candidate set.

EE 33. The device according to EE 32, wherein the input includes both the second output and the sample for calculating the second output.

EE 34. The device according to EE 32, wherein the first signal processing model and the second signal processing model can have different behaviors on the sample set identified as the second type.

EE 35. The device according to EE 32, wherein the training unit is further configured to train the second signal processing model by minimizing a second cost including an error between an output calculated from each of samples based on the first signal processing model and another output calculated from the same sample based on the second signal processing model.

EE 36. The device according to EE 32, wherein the first signal processing model and the second signal processing model are models for an audio content classifier.

EE 37. The device according to EE 32, wherein the first cost is a weighted sum of the errors, where the errors calculated for the samples belonging to the same sample set are assigned with the same weight.

EE 38. The device according to EE 37, wherein the errors calculated for the samples belonging to the sample sets identified as the same type are assigned with the same weight.

EE 39. The device according to EE 32, wherein the third signal processing model is implemented as a neural network.

EE 40. The device according to EE 39, wherein the neural network is a recurrent neural network.

EE 41. A device for training a third signal processing model via a machine learning method, comprising:
one or more processors for executing instructions so as to perform operations of:
a) calculating a first output from each first sample in a first sample set based on a first signal processing model;
b) calculating a second output from the first sample based on a second signal processing model; and
c) training a third signal processing model by minimizing a first cost including a first error between the first output and a third output, so that the combination of the second signal processing model and the third signal processing model can simulate the behavior of the first signal processing model on the first sample set, wherein the third output is an output of the third signal processing model in response to an input including the second output.

EE 42. A device for training a third signal processing model via a machine learning method, comprising:
one or more processors for executing instructions so as to perform operations of:
a) acquiring a candidate set as a result of adding into an initial set one or more of sample sets which have not been added into the initial set;
b) training a third signal processing model by
calculating a second output from each sample in the candidate set based on a second signal processing model, and
minimizing a first cost including an error calculated for each of the samples in the candidate set, so that the combination of the second signal processing model and the third signal processing model can simulate the behavior of a first signal processing model,
wherein if the sample belongs to a sample set identified as a first type, the error is calculated as a difference between a first output calculated from the sample based on the first signal processing model, and a third output of the third signal processing model in response to an input including the second output, and
if the sample belongs to a sample set identified as a second type, the error is calculated as a difference between a reference output and the third output;
c) calculating an average of the errors calculated for the samples in the candidate set; and
d) if the average is lower than a initial average associated with the initial set, setting the candidate set as the initial set, setting the average as the initial average and continuing to execute step a), and if the average is not lower than the initial average, continuing to execute step a).

The invention claimed is:

1. A method of training a third signal processing model via a machine learning method, comprising steps of:
a) calculating a first output from each sample in a first sample set based on a first signal processing model;
b) calculating a second output from each sample in the first sample set based on a second signal processing model; and
c) training the third signal processing model by minimizing a first cost including a first error between the first output and a third output, so that the combination of the second signal processing model and the third signal processing model can simulate the behavior of the first signal processing model on the first sample set, wherein the third output is an output of the third signal processing model in response to an input including the second output,
wherein the first signal processing model and the second signal processing model are models for an audio content classifier and the first output and the second output are classification results; and
wherein the third signal processing model is implemented as any one of a recurrent neural network, a mapping H with $H=(Q^TQ)^{-1}Q^TP$, or a mapping H with $H=(Q^TQ+r)^{-1}Q^TP$, where P and Q are M×N matrices, M is the number of samples in the first sample set, each row of P is one of the first outputs calculated from all the samples in the first sample set, each row of Q is one of the second outputs calculated from all the samples in the first sample set, and r is a regularization term for smoothing the mapping or avoiding over-fitting in the training process.

2. The method according to claim 1, wherein the input includes both the second output and the respective sample in the first sample set.

3. The method according to claim 1, comprising:
d) training the second signal processing model by minimizing a second cost including an error between an output calculated from each of samples based on the first signal processing model and another output calculated from the same sample based on the second signal processing model.

4. A method of training a third signal processing model via a machine learning method, comprising steps of:
a) calculating a first output from each sample in a first sample set based on a first signal processing model;
b) calculating a second output from each sample in the first sample set based on a second signal processing model; and
c) training the third signal processing model by minimizing a first cost including a first error between the first output and a third output, so that the combination of the second signal processing model and the third signal processing model can simulate the behavior of the first signal processing model on the first sample set, wherein the third output is an output of the third signal processing model in response to an input including the second output,
wherein the first signal processing model and the second signal processing model are models for an audio content classifier and the first output and the second output are classification results;
wherein the step b) further comprises calculating a fourth output from each sample in a second sample set based on the second signal processing model, wherein the first signal processing model and the second signal processing model can have different behaviors on the second sample set;
wherein the first cost includes the first error and a second error between the fourth output and a reference output; and wherein the third signal processing model is implemented as a mapping H:

$$H=(\alpha Q_X^T Q_X + \beta Q_Y^T Q_Y)^{-1}(\alpha Q_X^T P_X + \beta Q_Y^T L_Y),$$

where
$\alpha$ and $\beta$ are weights,
$P_X$ and $Q_X$ are M×N matrices, M is the number of samples in the first sample set, each row of $P_X$ is one of the first outputs calculated from all the samples in the first sample set, and each row of $Q_X$ is one of the second outputs calculated from all the samples in the first sample set, and
$L_Y$ and $Q_Y$ are K×N matrices, K is the number of samples in the second sample set, each row of $L_Y$ is one of the reference outputs for all the samples in the second sample set, and each row of $Q_Y$ is one of the fourth outputs calculated from all the samples in the second sample set.

5. The method according to claim 4, wherein the first cost is a weighted sum of the first error and the second error.

6. A method of training a third signal processing model via a machine learning method, comprising steps of:
   a) acquiring a candidate set as a result of adding into an initial set one or more of sample sets which have not been added into the initial set;
   b) training the third signal processing model by
      calculating a second output from each sample in the candidate set based on a second signal processing model, and
      minimizing a first cost including an error calculated for each of the samples in the candidate set, so that the combination of the second signal processing model and the third signal processing model can simulate the behavior of a first signal processing model,
   wherein if the sample belongs to a sample set identified as a first type, the error is calculated as a difference between a first output calculated from the sample based on the first signal processing model, and a third output of the third signal processing model in response to an input including the second output, and
   if the sample belongs to a sample set identified as a second type, the error is calculated as a difference between a reference output and the third output;
   c) calculating an average of the errors calculated for the samples in the candidate set; and
   d) if the average is lower than an initial average associated with the initial set, setting the candidate set as the initial set, setting the average as the initial average and continuing to execute step a), and if the average is not lower than the initial average, continuing to execute step a),
   wherein the first signal processing model and the second signal processing model are models for an audio content classifier and the first output and the second output are classification results; and
   wherein the third signal processing model is implemented as a neural network.

7. The method according to claim 6, wherein the input includes both the second output and the sample.

8. The method according to claim 6, wherein the first signal processing model and the second signal processing model can have different behaviors on the sample set identified as the second type.

9. The method according to claim 6, comprising:
   training the second signal processing model by minimizing a second cost including an error between an output calculated from each of samples based on the first signal processing model and another output calculated from the same sample based on the second signal processing model.

10. The method according to claim 6, wherein the first cost is a weighted sum of the errors, where the errors calculated for the samples belonging to the same sample set are assigned with the same weight.

11. The method according to claim 10, wherein the errors calculated for the samples belonging to the sample sets identified as the same type are assigned with the same weight.

12. The method according to claim 6, wherein the third signal processing model is implemented as the neural network, and the neural network is a recurrent neural network.

* * * * *